2,930,704

DEHYDRO-PACKAGING OF FRESH MEATS

Beverly E. Williams, La Grange Park, Ill., assignor to Hodges Research and Development Company, New York, N.Y., a corporation of California No Drawing. Application October 10, 1958
Serial No. 766,401

2 Claims. (Cl. 99—174)

This invention relates to packaging of fresh meats and more particularly to processes for treating fresh meats before packaging to improve the appearance of the meat in the package after storage of the same.

Heretofore it has been impossible to package fresh meats and keep them packaged for any appreciable length of time even under refrigerated conditions because the fresh meat exudes juices, blood and serum which discolors the surface of the meat and renders the package and the meat unsightly and unattractive to the purchaser. For this reason fresh meats, to be kept for any length of time after packaging, are now frozen.

It has now been found possible to keep fresh meat for extended periods in the chilled state (35° F.) when the animal or the meat is treated with an antibiotic and it is also now possible to keep fresh meats under refrigerated conditions (not frozen) for reasonable periods of time. The present invention relates to the packaging of such meat to prevent the meat in the packages from becoming unsightly with blood and juice caused either by drip due to the pressure of other meats piled on top of the cuts of meat during transportation or due to the natural osmosis exuding blood, juice and serum to the surface of the meat.

I have found that the difficulties discussed above in packaging fresh meat to be held under chilled conditions for extended periods of time can be eliminated by treating the meat or cuts of meat before packaging with a dry, chilled, oxygen-free gas containing from 1 to 5% carbon monoxide with the balance principally nitrogen with some carbon dioxide. Such a gas is obtained as the product of combustion of suitable hydrocarbons such as propane. The meat or cuts of meat are subjected to a flow of this combustion gas cooled to approximately 35° F. until the surfaces of the cuts of meat are dehydrated. The carbon monoxide content of the gas reddens the cut surfaces of the meat and the resulting reddened and dehydrated surfaces have an attractive appearance.

After the meat or cuts of meat have been subjected to this gas treatment the meat or cuts of meat are immediately packaged in a suitable wrap which is usually a transparent film material. It has been found that the surfaces of the meat will not darken and will not leak or weep even though the meat is maintained under chilled conditions for extended periods. The carbon monoxide in the treating gas reduces the myoglobin to an irreversible color which is bright red and the dry gas, having desiccated the surfaces of the meat, renders these surfaces capable of absorbing the juices which migrate from the interior of the meat. From this it will be apparent that the amount of desiccation of the surfaces of the meat should be correlated to the size of the meat, i.e., to the amount of drip which may be expected. As a general rule dehydration of a layer of the surface of approximately one eighth to one-quarter of an inch in thickness is sufficient to absorb the exuding juices and the like from within the cut of meat.

It is therefore the object of the present invention to provide novel processes, which I call dehydro-packaging of fresh meats, for the treatment of fresh meats before packaging to redden the cut surfaces of the meat and to prevent drip and leakage from the meat after packaging during storage for extended periods under chilled conditions.

As pointed out above, meat treated with antibiotics will keep for extended periods on the order of eight weeks under refrigerator temperatures of approximately 35° F. The meat may be treated with a suitable antibiotic either before or after slaughter. It is preferred to inject each cattle before slaughter at a suitable injection site such as the intraperitoneal cavity, the base of the ear, or the base of the tail with a suitable broad spectrum antibiotic such as Terramycin, Aureomycin, Chloromycetin, Streptomycin or Panmycin and the like. The dose level for the antibiotic should approximate 2 mg. per pound of live weight of the cattle so that a 1000 pound steer will receive a two gram shot or dose. If the meat is to be treated after slaughter then the carcass is injected or dipped into the antibiotic to give a tissue level of from one to five parts per million.

Whether the meat or the cattle has been subjected to or treated with antibiotics or not the wholesale or retail cuts of meat are dehydro-packaged in accordance with the present invention, as described above, by blowing a jet stream of cold, dry, non-oxidizing gas containing carbon monoxide with a suitable enclosure over the cut surface of the meat for a sufficient length of time to dehydrate the surfaces to a depth correlated to the time and conditions under which the meat is to be kept packaged. The dehydrated surface of the meat, reddened by the carbon monoxide in the gas, will absorb the juices which through osmosis or pressure bleed to the surface.

I have further found that the cuts of meat may be vacuum packaged after having been subjected to the dehydrating action of the cold non-oxidizing combustion gas in accordance with the present concept.

As an example of the processes of the present concept, vacuum packaged steaks were first subjected to the dehydrating action of cold (35° F.), non-oxidizing combustion gas containing approximately 1% carbon monoxide, 85% nitrogen, 12% carbon dioxide, the balance of the gas being hydrogen and traces of other gases. These steaks were approximately one inch in thickness and the surfaces were desiccated to a depth of approximately ⅛ inch and were then vacuum packaged in an air-tight package of suitable transparent film-like material, which was immediately thereafter heat-shrunk to be form fitting. One-third of the steaks so treated were held at 33° F. for two weeks and the other third were frozen at 0° F. and held for the same period before inspection, while the remaining third were held as regular, control or packaged steaks at 33° F.

Inspection revealed that in the fresh steaks treated in accordance with the present invention the blood had moved into the desiccated area and these steaks appeared to have been freshly packaged and were without excess drip or leakage. Control steaks similarly packaged and held at 33° F. but not treated with the gas of the present concept were moist and slimy on the surfaces and the packages had a undesirable and unattractive appearance. The frozen, gas-desiccated steaks showed a dry, dehydrated surface and were not considered to be as attractive to the purchaser as regular steaks similarly packaged and frozen but not treated with the gas in accordance with the present concept.

It is therefore apparent that the present process is particularly applicable to fresh meat packaged in air-tight, moisture-proof material to be kept fresh at refrigerated temperatures, and not frozen.

In another example wholesale cuts of ribs and loins were first encased in an air-tight, moisture-proof film, a vacuum was drawn on the meat and the film ends securely tied to prevent loss of the vacuum. The packaged meat was stored at 33° F. and was observed at various intervals up to twenty-four days. In all cases beyond two weeks the surface red meat had turned dark or black and the blood which oozed out was black and the interior of the package was wet and slimy. The fat had a dead white appearance.

Similar cuts of ribs and loins were at the same time treated in accordance with the present concept using chilled combustion gas containing carbon monoxide and after a few minutes exposure to the desiccating and reddening effect of the gas the wholesale cuts were then encased in a suitable film and a vacuum was drawn. The vacuum in the package was then partially broken by the admission of more of the desiccating gas. This entrapped the desiccating gas in the crevices and interstices and void areas of the cuts of meat. The meat was then stored under non-freezing conditions at 33° F. and upon inspection over a period of twenty-four days was found to be fresh in smell, the cut meat surfaces were of better and redder appearance and the fat had a life-like appearance.

It should now be apparent that the present invention provides a novel method for dehydro-packaging of fresh meats which permits fresh meat to be packaged and kept packaged at refrigerator temperatures, not frozen, for extended period of time without discoloration of the cut surfaces of the meat and without destroying the desirable appearance of the meat in the package by the presence in the package of moisture and meat juices which have oozed or leaked from the cuts of meat.

Changes in or modifications to the above described examples of the present concept may now be suggested to those skilled in the art without departing from the present inventive concept. Reference should therefore be had to the appended claims to determine the scope of this invention.

What is claimed is:

1. In a method for packaging cuts of fresh meat the steps of dehydrating the cut surfaces of the meat to depths of from approximately ⅛ to ¼ of an inch by passing a cold, dry, oxygen-free gas containing principally nitrogen and from approximately 1 to 5% carbon monoxide over the meat and then enclosing the cuts of meat in a substantially air-tight and moisture-proof package whereby leaking of blood, juice and serum from the meat into the container is prevented and the package remains attractive to the purchaser.

2. In a method for packaging fresh meat the steps of dehydrating the surfaces of the meat to depths of one-eighth to one-quarter of an inch by flowing a cold, dry, oxygen-free gas containing principally nitrogen and from approximately 1 to 5% carbon monoxide thereover and then enclosing the meat in a substantially air-tight and moisture-proof package whereby leaking of blood, juice and serum from the meat into the container is prevented and the package remains attractive to the purchaser.

References Cited in the file of this patent

UNITED STATES PATENTS

| | | |
|---|---|---|
| 2,490,951 | Dunkley | Dec. 13, 1949 |
| 2,623,826 | Grinstead | Dec. 30, 1952 |
| 2,825,652 | Berkowitz | Mar. 4, 1958 |
| 2,865,767 | Gore | Dec. 23, 1958 |